United States Patent
Lin

(10) Patent No.: US 8,834,308 B2
(45) Date of Patent: Sep. 16, 2014

(54) TRANSPORTING APPARATUS WITH BELT

(75) Inventor: Hsiu-Yu Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 385 days.

(21) Appl. No.: 13/296,309

(22) Filed: Nov. 15, 2011

(65) Prior Publication Data

US 2012/0252617 A1    Oct. 4, 2012

(30) Foreign Application Priority Data

Mar. 31, 2011    (TW) .............................. 100111187 A

(51) Int. Cl.
*F16H 7/24*    (2006.01)
*F16H 7/08*    (2006.01)

(52) U.S. Cl.
CPC ........................................ *F16H 7/08* (2013.01)
USPC ............. 474/150; 474/94; 400/545; 400/568; 400/571

(58) Field of Classification Search
CPC .. F16H 7/08; B65H 2403/20; B65H 2403/21; B65H 2403/25; B41J 29/38
USPC ............ 474/148, 150, 166, 94; 400/545, 568, 400/571, 636.2; 347/101, 104
See application file for complete search history.

(56) References Cited

U.S. PATENT DOCUMENTS 5,591,093 A *    1/1997   Asai et al. ........................ 474/94
2007/0126796 A1 *    6/2007   Knight et al. .................... 347/50

* cited by examiner

*Primary Examiner* — William E Dondero
(74) *Attorney, Agent, or Firm* — Novak Druce Connolly Bove + Quigg LLP

(57) ABSTRACT

A transporting apparatus is disclosed. The transporting apparatus comprises a mounting plate; a assistant wheel assembly attached to the mounting plate, the assistant wheel assembly comprising an inner wheel, an outer wheel, and an elastic member; the elastic member is between the inner wheel and the outer wheel; a driving wheel movably attached to the mounting plate; a driving member secured to the driving wheel; and a belt connecting the outer wheel and the driving member; wherein the elastic member is generally deformed at a location where the belt warps on the outer wheel.

17 Claims, 3 Drawing Sheets

TRANSPORTING APPARATUS WITH BELT

BACKGROUND

1. Technical Field

The present disclosure relates to transporting apparatuses, more particularly, to a transporting apparatus with a belt.

2. Description of Related Art

A transporting apparatus used in a printer may include two wheels and a belt connecting the two wheels. In use, the two wheels are rotated, and the belt is moved. However, the two wheels may be made of metal such that the belt may slip. Such a slippage may cause damages to the transporting apparatus, or to pieces of paper, or to other printing medium, and resulting in low quality printing. Therefore, an improved transporting apparatus may be desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
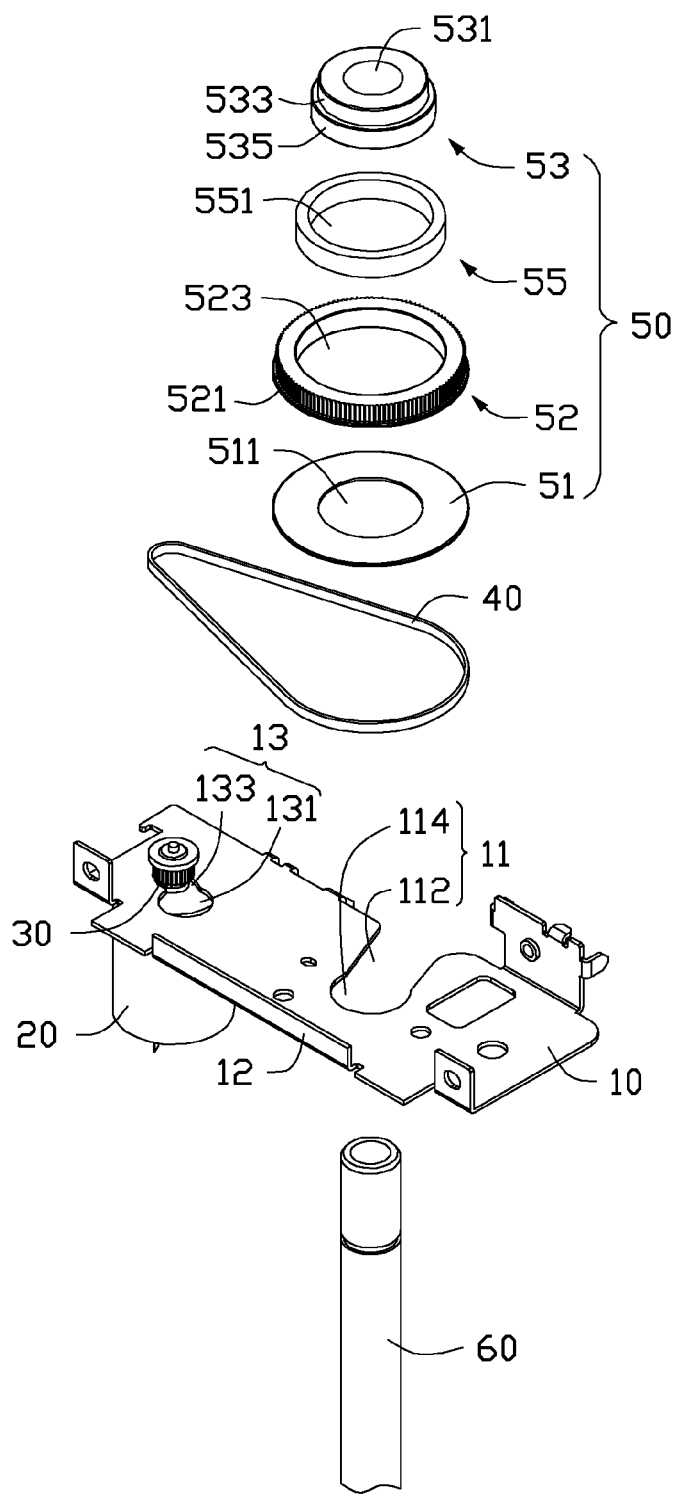
FIG. 1 is an exploded, isometric view of a transporting apparatus in accordance with an embodiment.
Figure 2:
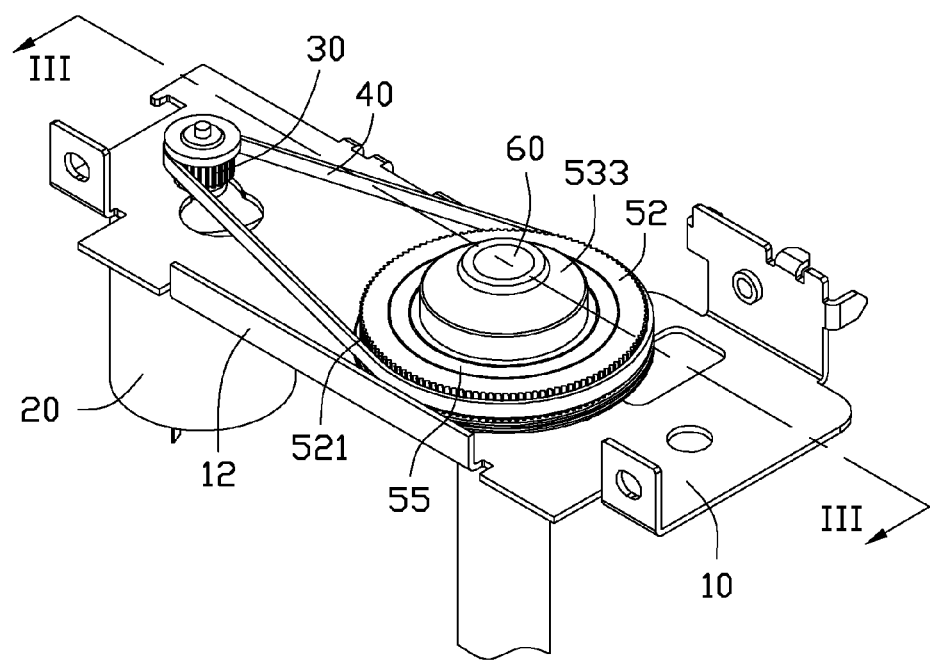
FIG. 2 is an assembled view of the transporting apparatus of FIG. 1.

Referring to FIGS. 1 and 2, a transporting apparatus in accordance with an embodiment comprises a mounting plate 10, a driving member 20, a driving wheel 30, a belt 40, an assistant wheel assembly 50, and a shaft 60 attached to the assistant wheel assembly 50. The driving member 20 is secured to the mounting plate 10, and the driving wheel 30 is attached to the driving member 20. In one embodiment, a print head of a printer is mounted on or attached to the transporting apparatus.

The mounting plate 10 comprises a flange 12. In one embodiment, the flange 12 is substantially perpendicular to the mounting plate 10. A cutout 11 is defined in the mounting plate 10 towards the flange 12. The cutout 11 comprises a guiding portion 112, and a positioning portion 114 communicating with the guiding portion 112. In relation to a line substantially perpendicular to the flange 12, the guiding portion 112 is slanted. In one embodiment, the positioning portion 114 is arcuate.

The driving wheel 30 is moveably located on a top surface of the mounting plate 30. In one embodiment, the mounting plate 10 defines a sliding slot 13. The sliding slot 13 comprises a first retaining portion 131, and a second retaining portion 133 communicating with the first retaining portion 131. The driving wheel 30 may protrude from either the first retaining portion 131 or the second retaining portion 133, to accommodate different diameters of the driving wheel 30.

The assistant wheel assembly comprises a gasket 51, an outer wheel 52, an inner wheel 53, and an elastic member 55 between the outer wheel 52 and the inner wheel 53. In one embodiment, the elastic member 55 is annular. The gasket 51 defines a through hole 511 corresponding to the positioning portion 114. A plurality of teeth 521 are defined in an outer surface of the outer wheel 52. The outer wheel 52 defines a receiving hole 523. In one embodiment, the gasket 51 is made from latex to increase friction forces between the outer wheel 52 and the mounting plate 10.

An extending hole 531 is defined in the inner wheel 53. The inner wheel 53 comprises a first securing portion 533, and a second securing portion 535 connected to the first securing portion 533. In one embodiment, the elastic member 55 is made of latex to increase friction forces between the outer wheel 52 and the inner wheel 53. The elastic member 55 defines a mounting hole 551.

In one embodiment, an external diameter of the gasket 51 is substantially equal to that of the outer wheel 52, but greater than that of the elastic member 55. The diameter of the elastic member 55 is greater than that of the second securing portion 535, but substantially equal to the interior diameter of the outer wheel 52. A diameter of the extending portion 531 is substantially equal to that of the shaft 60; but less than a diameter of the mounting hole 551 or a diameter of receiving hole 523.

Figure 3:
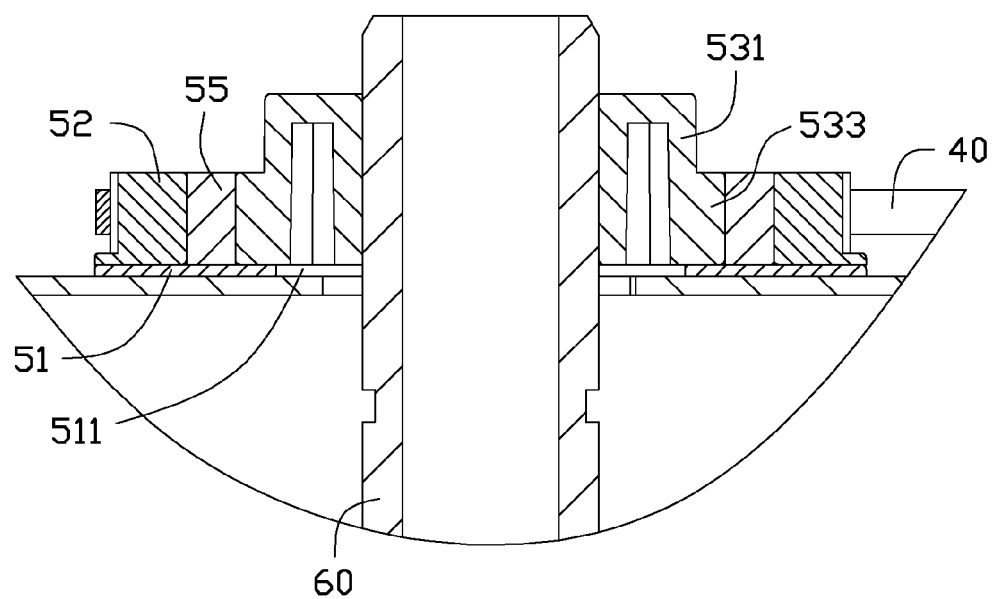
FIG. 3 is a cross-sectional view along line III-III of the apparatus of FIG. 2.

Referring to FIGS. 2-3, in assembly, the gasket 51 is attached to the mounting plate 10, and the through hole 511 is aligned with the positioning portion 114. The outer wheel 52 is attached to the gasket 51, and the receiving hole 523 is aligned with the through hole 511. The belt 40 is placed over the driving wheel 30 and the outer wheel 52 to transfer rotational energy efficiently.

The elastic member 55 is attached to the second securing portion 535 and abuts an inner surface of the outer wheel 52. Thus, the elastic member 55 is sandwiched between the inner wheel 53 and the outer wheel 52. The shaft 60 is manipulated into the portioning portion 114 from the guiding portion 112, and extends through the positioning portion 114, the through hole 511, the receiving hole 523, the mounting hole 551, and the extending hole 531. Therefore, the gasket 51, the outer wheel 52, the elastic member 55, and the inner wheel 53 are held in a particular orientation in relation to the mounting plate 10 by the shaft 60.

In use, the driving member 20 rotates the driving wheel 30, to rotate the assistant wheel assembly 50 by through the belt 40. A thickness and a location of the elastic member 55 are such that a portion of the elastic member 55 is compressed at a point or an area on a circumference of the elastic member 55, wherein the point or the area is furthest from the driving member 20 due a pressure from the belt 40. The point or area of compression moving around the circumference of the elastic member 55 as it is rotated. In other words, the elastic member 55 is adapted to vary it's thickness as it is rotated to and away from under a tension side of the belt 40. Variation of tension forces on the belt 40 may be modulated by the elastic member 55. Therefore, the belt 40 is subjected to an even tension and the likelihood of belt slippage, or slippage between the outer and inner wheels 52 and 53, may be greatly reduced.

Although numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclo-

What is claimed is:

1. A transporting apparatus comprising:
a mounting plate;
an assistant wheel assembly attached to the mounting plate, the assistant wheel assembly comprising an inner wheel, an outer wheel, a gasket, and an elastic member; the elastic member is between the inner wheel and the outer wheel; the gasket is located between the outer wheel and the mounting plate;
a driving wheel movably attached to the mounting plate;
a driving member secured to the driving wheel; and
a belt connecting the outer wheel and the driving member;
wherein the elastic member is generally deformed at a location where the belt wraps on the outer wheel.

2. The transporting apparatus of claim 1, wherein the mounting plate comprises a flange and defines a cutout, the cutout comprises a guiding portion, and the guiding portion is slanted in relation to a line substantially perpendicular to the flange.

3. The transporting apparatus of claim 2, wherein the cutout further comprises a positioning portion communicating with the guiding portion, and the positioning portion is arcuate.

4. The transporting apparatus of claim 1, wherein the inner wheel is separated from the outer wheel by the elastic member.

5. The transporting apparatus of claim 1, further comprising a shaft extending through the assistant wheel assembly, the assistant wheel assembly engages with the mounting plate through the shaft.

6. The transporting apparatus of claim 1, wherein the driving wheel is on a top surface of the mounting plate, the driving member is on a bottom surface, opposite to the top surface of the mounting plate.

7. The transporting apparatus of claim 1, wherein the inner wheel comprises a first securing portion, and a second securing portion connected to the first securing portion; a diameter of the second securing portion is greater than a diameter of the first securing portion, and the elastic member abuts on the second securing portion.

8. The transporting apparatus of claim 1, wherein the mounting plate defines a sliding slot, the sliding slot comprises a first retaining portion, and a second retaining portion communicating with the first retaining portion, and the driving wheel is adapted to engage in the first retaining portion or the second retaining portion.

9. A transporting apparatus comprising:
a mounting plate defining a sliding slot;
a assistant wheel assembly attached to the mounting plate; the assistant wheel assembly comprising an inner wheel, an outer wheel, and an elastic member;
a driving wheel movably received in the sliding slot for being movably attached to the mounting plate;
a driving member securing to the driving wheel; and
a belt connected to the outer wheel and the driving member;
wherein the elastic member surrounds on the inner wheel and abuts on an inner surface of the outer wheel; the driving member rotates the driving wheel and the assistant wheel assembly by the belt; the elastic member is deformed when it is under a tension from the belt; and the elastic member is released when it is free of tension from the belt.

10. The transporting apparatus of claim 9, wherein the mounting plate comprises a flange and defines a cutout, the cutout comprises a guiding portion, and the guiding portion is slanted in relation to a line substantially perpendicular to the flange.

11. The transporting apparatus of claim 10, wherein the cutout further comprises a positioning portion communicating with the guiding portion, and the positioning portion is arcuate.

12. The transporting apparatus of claim 9, wherein the inner wheel is separated from the outer wheel by the elastic member.

13. The transporting apparatus of claim 9, further comprising a shaft, extending through the assistant wheel assembly, the assistant wheel assembly engages with the mounting plate through the shaft.

14. The transporting apparatus of claim 9, wherein the driving wheel is on a top surface of the mounting plate, and the driving member is on a bottom surface, opposite to the top surface of the mounting plate.

15. The transporting apparatus of claim 9, wherein the assistant wheel assembly further comprises a gasket, and the gasket is located between the outer wheel and the mounting plate.

16. The transporting apparatus of claim 9, wherein the sliding slot comprises a first retaining portion, and a second retaining portion communicating with the first retaining portion, and the driving wheel is adapted to engage in the first retaining portion or the second retaining portion.

17. The transporting apparatus of claim 9, wherein the inner wheel comprising a first securing portion, and a second securing portion connected to the first securing portion, and a diameter of the second securing portion is greater than a diameter of the first securing portion.

* * * * *